(12) United States Patent
Cheng et al.

(10) Patent No.: US 7,850,186 B2
(45) Date of Patent: Dec. 14, 2010

(54) BICYCLE FRAME WITH A RECEIVING SPACE

(76) Inventors: Yuan-Chih Cheng, P.O. Box 44-2049, Taipei (TW) 10668; Chun-Hung Lin, P.O. Box 44-2049, Taipei (TW) 10668

( * ) Notice: Subject to any disclaimer, the term of this patent is extended or adjusted under 35 U.S.C. 154(b) by 10 days.

(21) Appl. No.: 12/076,961

(22) Filed: Mar. 26, 2008

(65) Prior Publication Data
US 2009/0243256 A1 Oct. 1, 2009

(51) Int. Cl.
*B62K 3/02* (2006.01)
(52) U.S. Cl. .................................. 280/281.1; 280/287
(58) Field of Classification Search ............... 280/281.1, 280/287
See application file for complete search history.

(56) References Cited

U.S. PATENT DOCUMENTS

| | | | | |
|---|---|---|---|---|
| 642,493 | A * | 1/1900 | Rosenberg | 280/281.1 |
| 4,540,190 | A * | 9/1985 | Moulton | 280/278 |
| 5,149,119 | A * | 9/1992 | Hwang | 280/275 |
| 5,419,573 | A * | 5/1995 | Kao | 280/278 |
| 5,951,034 | A * | 9/1999 | Mayo | 280/288.1 |
| 6,979,013 | B2 * | 12/2005 | Chen | 280/287 |
| 7,055,842 | B1 * | 6/2006 | Lin | 280/278 |
| 7,156,409 | B2 * | 1/2007 | Chuang | 280/287 |
| 7,243,936 | B2 * | 7/2007 | Huang | 280/278 |
| 7,377,535 | B2 * | 5/2008 | Chamberlain | 280/284 |
| 2002/0067020 | A1 * | 6/2002 | Wang | 280/263 |
| 2003/0234510 | A1 * | 12/2003 | Ho et al. | 280/281.1 |
| 2004/0207172 | A1 * | 10/2004 | Meggiolan | 280/281.1 |
| 2005/0062256 | A1 * | 3/2005 | Chen | 280/287 |
| 2009/0014981 | A1 * | 1/2009 | Perry | 280/281.1 |

* cited by examiner

*Primary Examiner*—Lesley Morris
*Assistant Examiner*—Michael R Stabley

(57) ABSTRACT

A bicycle frame includes a head tube, a seat tube and at least one tube connected between the head tube and the seat tube. The at least one tube includes a first longitudinal tube connected to the head tube and a second longitudinal tube connected to the seat tube, a transverse tube is connected between the first and second longitudinal tubes. The transverse tube includes a receiving space in which a lock or a light device is received.

11 Claims, 5 Drawing Sheets

BICYCLE FRAME WITH A RECEIVING SPACE

BACKGROUND OF THE INVENTION (1) Field of the Invention

The present invention relates to a bicycle frame with a space defined in one of the tubes so as to accommodate a lock or a light device.

(2) Description of the Prior Art

A conventional bicycle does not provided with a lock which is generally purchased by the user and hangs on a proper position on the frame. Some of the bicycles equipped with a simple lock which usually is located on the front fork to lock the front wheel or on the seat stays so as to lock the rear wheel. Nevertheless, the lock is made by metal material and is easily loosened so that the coating of the frame is scraped by the loosened lock and being rusting. Furthermore, the lock is exposed and easily damaged by theft.

The present invention intends to provide a bicycle frame wherein the top tube is composed two longitudinal tubes with a transverse tube connected therebetween, a receiving space is defined in the transverse tube and a lock or a light device is received in the space.

SUMMARY OF THE INVENTION

The present invention relates to a bicycle frame which includes a head tube, a seat tube and at least one tube connected between the head tube and the seat tube. The at least one tube includes a first longitudinal tube connected to the head tube and a second longitudinal tube connected to the seat tube, a transverse tube is connected between the first and second longitudinal tubes. The transverse tube includes a receiving space in which a lock or a light device can be received.

The primary object of the present invention is to provide a bicycle frame with a receiving space in one of the tubes of the bicycle frame and a lock or a light device can be received in the receiving space such that the lock or light device does not loosened and scrap coating of the bicycle frame.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
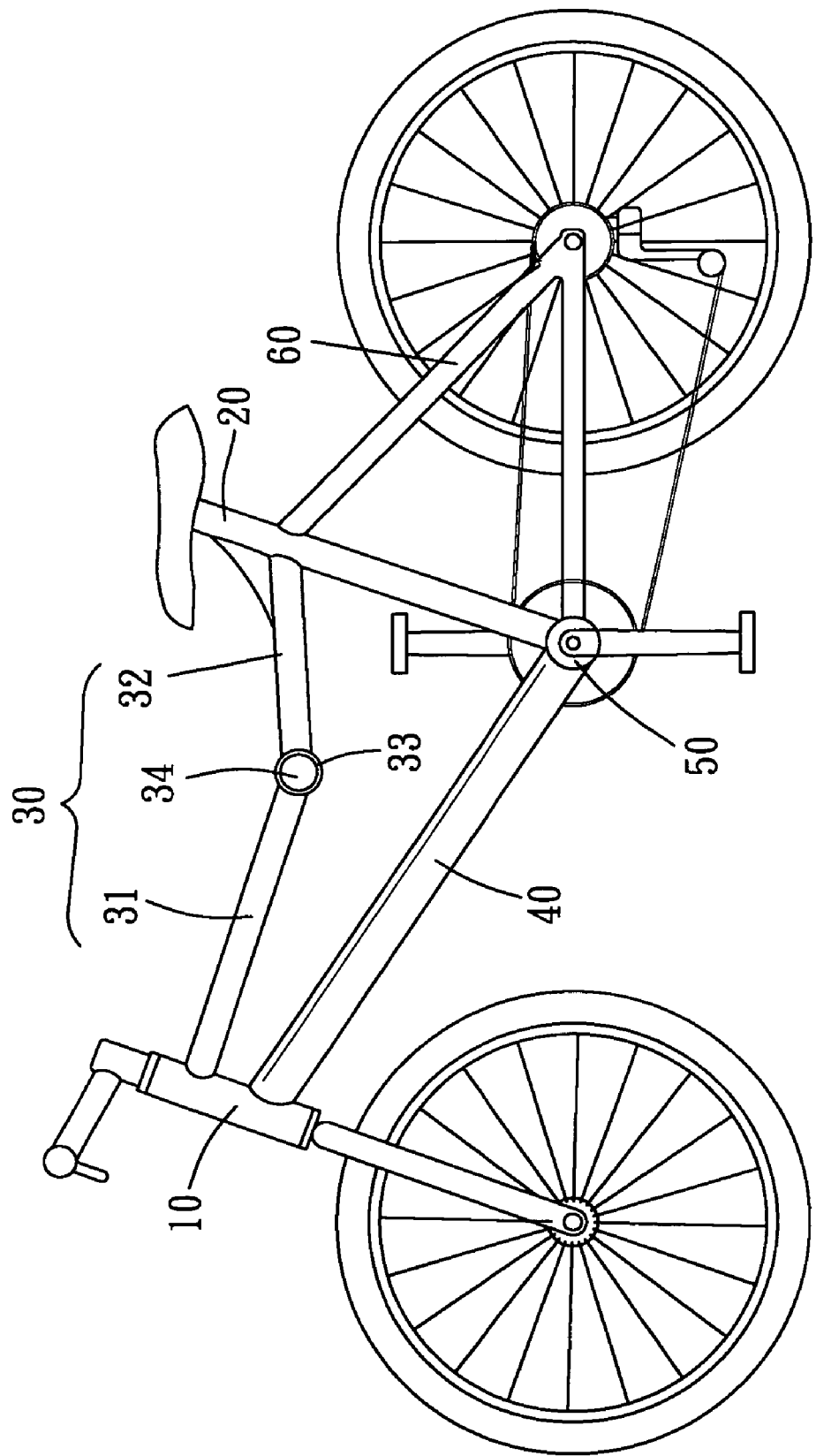
FIG. 1 is a side view of a bicycle with the bicycle frame of the present invention.

Referring to FIG. 1, the bicycle frame of the present invention comprises a head tube 10 with a front fork connected thereto, a front wheel and a handlebar are connected to the front fork, a top tube 30 and a down tube 40 extend from the head tube 10, a seat tube 20 connected to the top tube 30 and the down tube 40, two seat stays 60 and two chain stays connected to the seat tube 20, a bottom bracket 50 connected to a conjunction portion of the seat tube 20, the down tube 40 and the chain stays, a rear wheel is connected between the seat stays 60 and the chain stays, an axle extending through the bottom bracket and two crank with pedals connected to the axle.

The top tube 30 includes a first longitudinal tube 31 connected to the head tube 10 and a second longitudinal tube 32 connected to the seat tube 20, a transverse tube 33 is connected between the first and second longitudinal tubes 31, 32. The transverse tube 33 is substantially perpendicular to the first and second longitudinal tubes 31, 32. The transverse tube 33 is a hollow tube with at least one open end and a receiving space 34 is defined in the transverse tube 33.

Figure 2A:
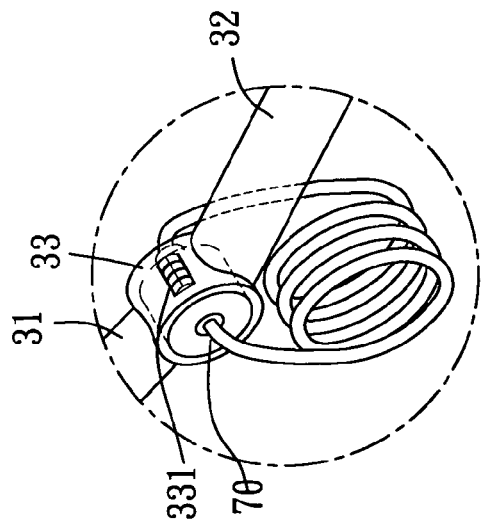
FIG. 2A shows that the operation rings of the combination lock are accessible via the window in the transverse tube.
Figure 2:
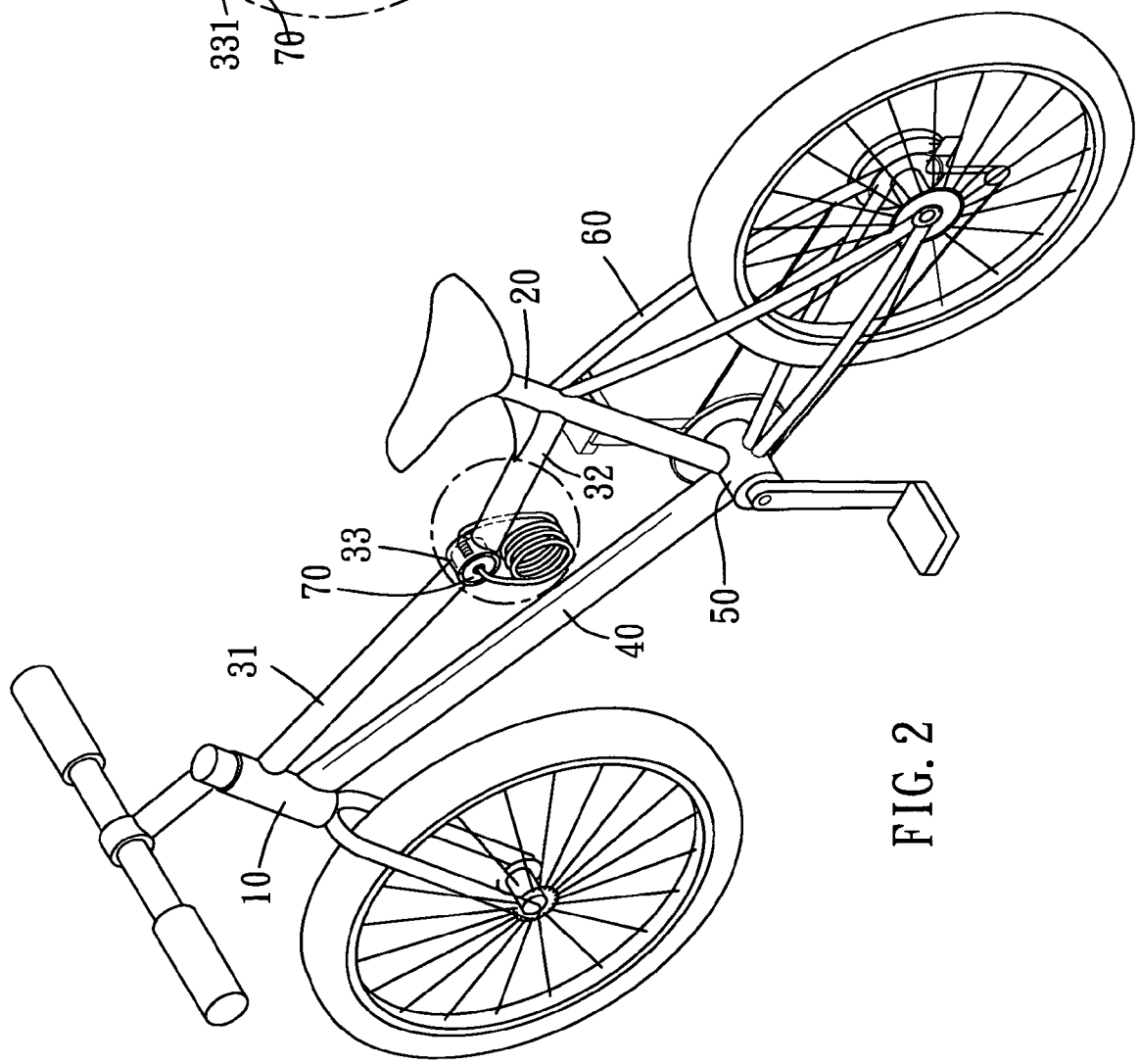
FIG. 2 is a perspective view to show the bicycle with the bicycle frame of the present invention, wherein a combination lock is received in the receiving space.

As shown in FIGS. 2 and 2A, the transverse tube 33 includes a window 331 and a lock 70 is received in the receiving space 34. The lock 70 is snugly engaged with the receiving space 34 so that it does not loose. In this embodiment, the lock 70 is a combination lock which includes multiple operation rings which are accessed via the window 331. By this arrangement, the user does not need to take the lock 70 out from the receiving space 34 to lock the bicycle.

Figure 3:
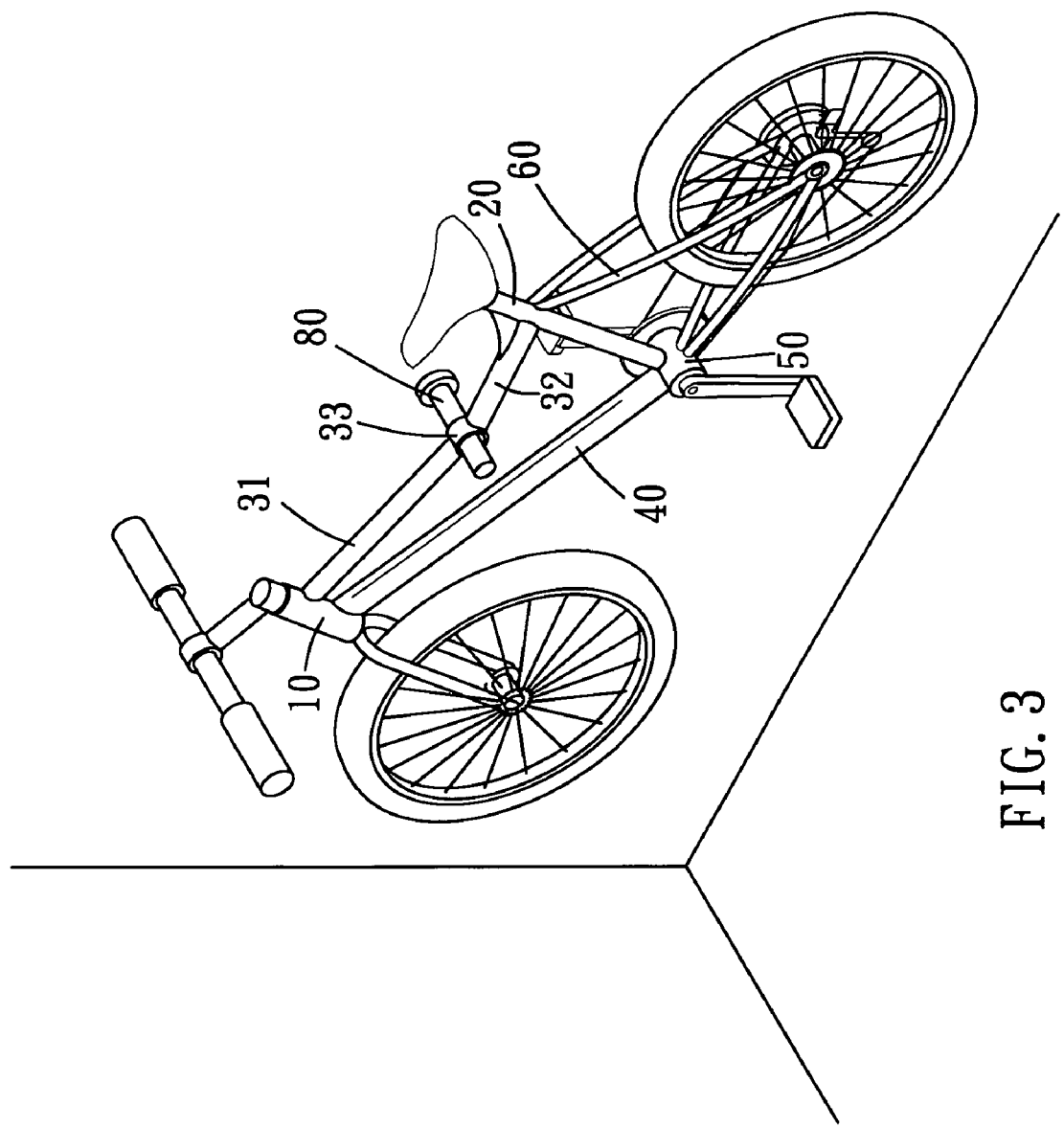
FIG. 3 shows a cantilever member on a wall extends through the transverse tube of the bicycle frame of the present invention.

As shown in FIG. 3, the transverse tube 33 is located a center of gravity of the bicycle frame and a cantilever member 80 on a wall extends through the transverse tube 33 of the bicycle frame of the present invention so that the bicycle frame is easily hanged on the cantilever member 80 in a balance status.

Figure 4:
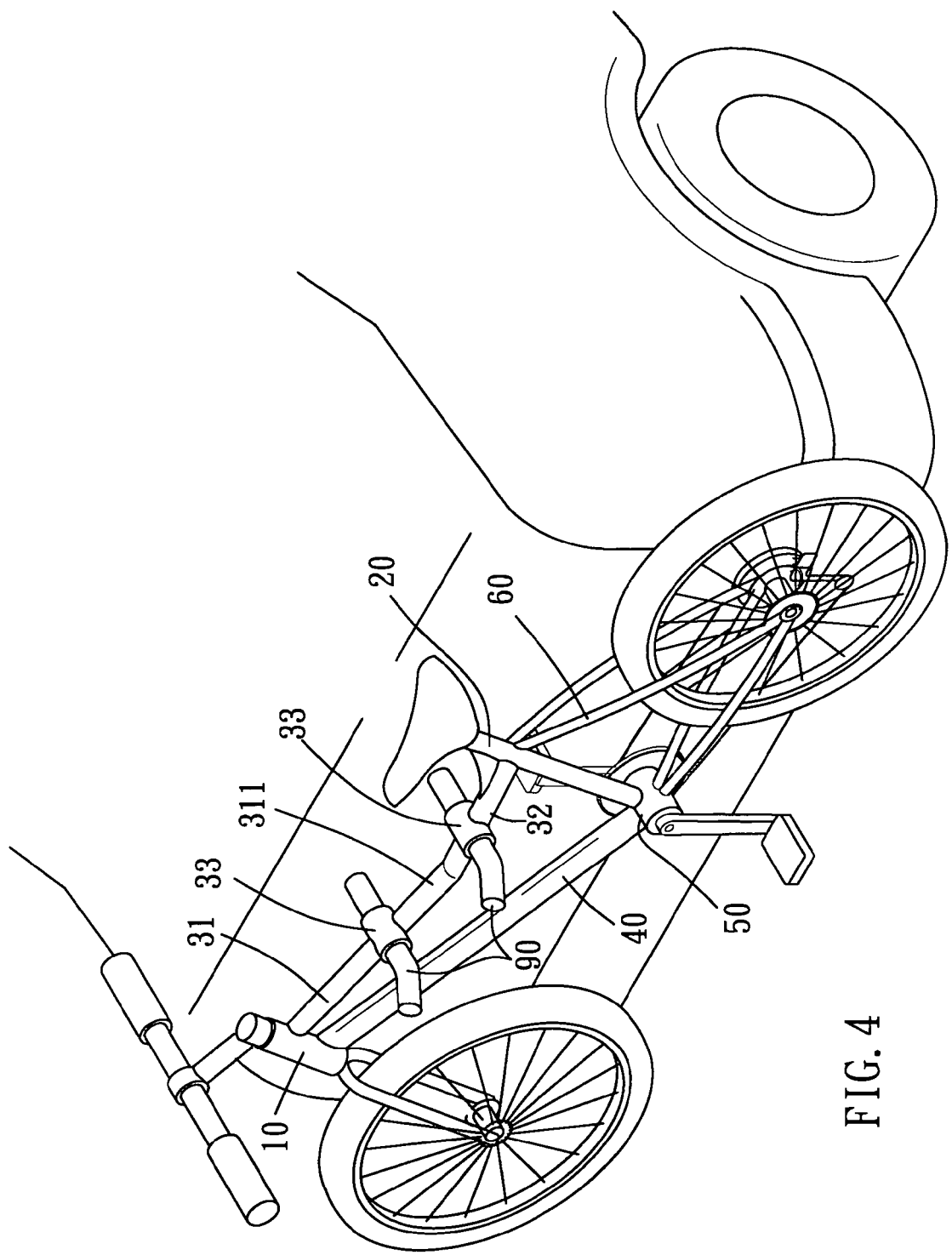
FIG. 4 shows the bicycle frame having two transverse tubes through which two support rods of a bicycle carrier extend.

As shown in FIG. 4, the bicycle frame may have two transverse tubes 33 and two support rods of a bicycle carrier on a vehicle extend through the two transverse tubes 33 so as to carry the bicycle in a stable status.

Figure 5:
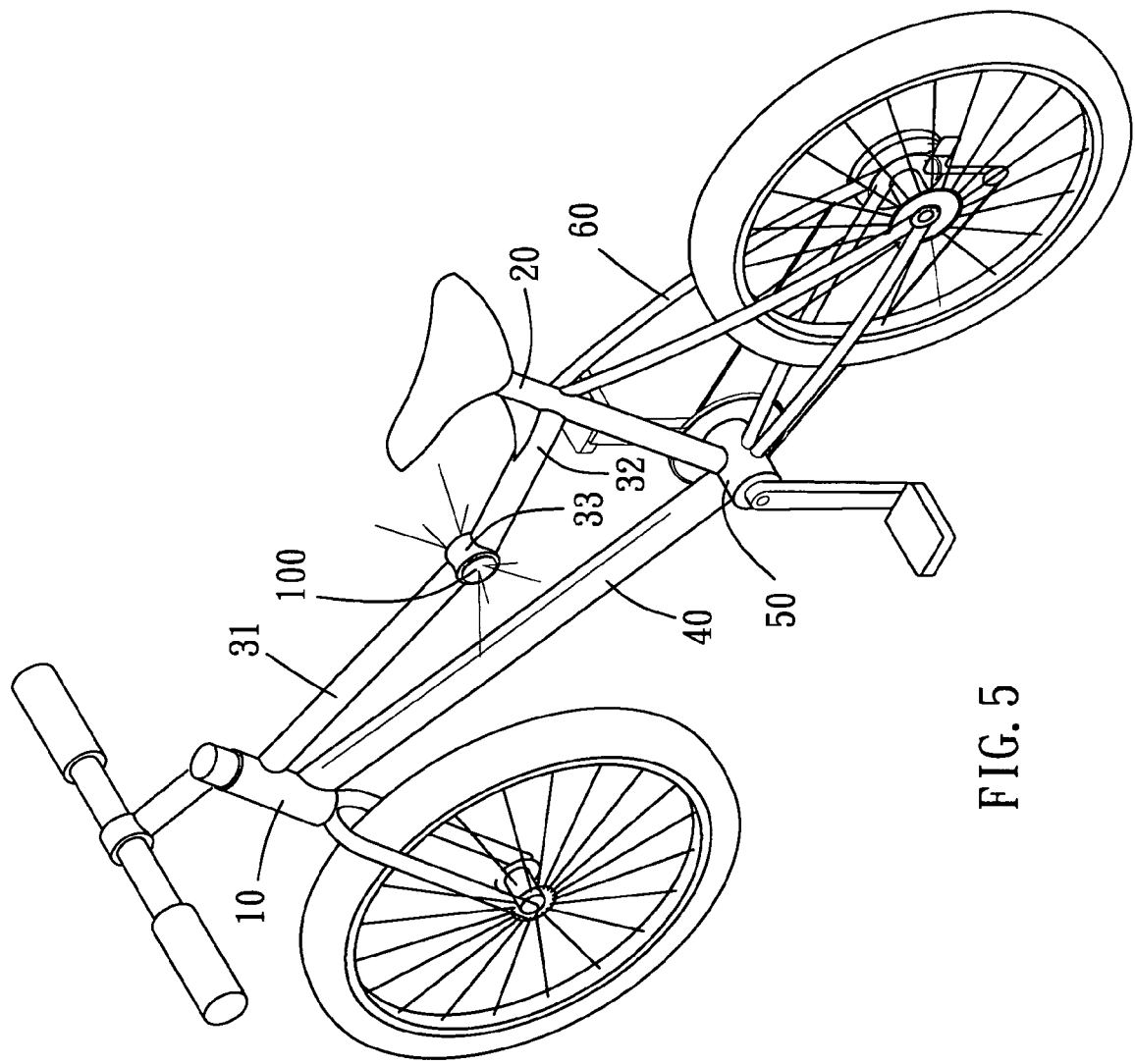
FIG. 5 shows that a light device is received in the transverse tube.

FIG. 5 shows that a light device 100 is received in the space 34 of the transverse tube 33 to allow the bicycle to be more visible.

It is noted that the down tube 40 may also include a transverse tube 33 when needed.

While we have shown and described the embodiment in accordance with the present invention, it should be clear to those skilled in the art that further embodiments may be made without departing from the scope of the present invention.

What is claimed is:

1. A bicycle frame comprising:
a head tube, a seat tube and at least one tube connected between the head tube and the seat tube, the at least one tube including a first longitudinal tube connected to the head tube and a second longitudinal tube connected to the seat tube, a transverse tube connected between the first and second longitudinal tubes, the transverse tube including a receiving space;
wherein a lock is received in the space;
wherein the transverse tube includes a window and the lock is a combination lock which includes multiple operation rings which are accessed via the window.

2. The bicycle frame as claimed in claim 1, wherein the transverse tube is substantially perpendicular to the first and second longitudinal tubes.

3. The bicycle frame as claimed in claim 1, wherein the transverse tube is located a center of gravity of the bicycle frame.

4. The bicycle frame as claimed in claim 1, wherein the transverse tube is a hollow tube with at least one open end.

5. The bicycle frame as claimed in claim 1, wherein the at least one tube is a top tube of the bicycle frame.

6. A bicycle frame comprising:
a head tube, a seat tube and at least one tube connected between the head tube and the seat tube, the at least one tube including a first longitudinal tube connected to the head tube and a second longitudinal tube connected to the seat tube, a transverse tube connected between the first and second longitudinal tubes, the transverse tube including a receiving space;
wherein a light device is received in the space.

7. The bicycle frame as claimed in claim 6, wherein a lock is received in the space.

8. The bicycle frame as claimed in claim 6, wherein the transverse tube is substantially perpendicular to the first and second longitudinal tubes.

9. The bicycle frame as claimed in claim 6, wherein the transverse tube is located a center of gravity of the bicycle frame.

10. The bicycle frame as claimed in claim 6, wherein the transverse tube is a hollow tube with at least one open end.

11. The bicycle frame as claimed in claim 6, wherein the at least one tube is a top tube of the bicycle frame.

* * * * *